US009149960B2

(12) United States Patent
Oeuvrard et al.

(10) Patent No.: US 9,149,960 B2
(45) Date of Patent: Oct. 6, 2015

(54) MOLDING A PLASTIC ELEMENT HAVING AN INSERT

(75) Inventors: Jean Oeuvrard, Pontoise (FR); Gérald Marchetto, Saint Just (FR)

(73) Assignee: Faurecia Interieur Industrie, Nanterre (FR)

( * ) Notice: Subject to any disclaimer, the term of this patent is extended or adjusted under 35 U.S.C. 154(b) by 572 days.

(21) Appl. No.: 13/458,776

(22) Filed: Apr. 27, 2012

(65) Prior Publication Data
US 2013/0115427 A1  May 9, 2013

(30) Foreign Application Priority Data

Apr. 29, 2011  (FR) ...................................... 11 53682

(51) Int. Cl.
B29C 45/14 (2006.01)
B29C 45/33 (2006.01)
B29C 45/44 (2006.01)
B29L 31/30 (2006.01)

(52) U.S. Cl.
CPC ............ B29C 45/14 (2013.01); B29C 45/14344 (2013.01); B29C 45/33 (2013.01); B29C 45/44 (2013.01); *B29C 45/14065* (2013.01); *B29C 2045/14442* (2013.01); *B29L 2031/3041* (2013.01); *Y10T 428/24479* (2015.01)

(58) Field of Classification Search
None
See application file for complete search history.

(56) References Cited

U.S. PATENT DOCUMENTS

| 5,501,829 | A | * | 3/1996 | Nichols | .......................... 264/261 |
| 5,531,950 | A | * | 7/1996 | Kimura et al. | ................ 264/135 |
| 6,202,276 | B1 | * | 3/2001 | Chuang | .......................... 29/421.1 |
| 6,739,856 | B2 | * | 5/2004 | Cesano | .......................... 425/112 |
| 6,998,082 | B2 | * | 2/2006 | Yang | .............................. 264/156 |
| 7,320,771 | B2 | * | 1/2008 | Grando | .......................... 264/273 |
| 7,976,758 | B2 | * | 7/2011 | Hsu et al. | ....................... 264/267 |
| 2005/0023724 | A1 | | 2/2005 | Cesano | |
| 2008/0292851 | A1 | | 11/2008 | Egerer et al. | |

FOREIGN PATENT DOCUMENTS

| DE | 19818881 | * | 11/1998 |
| EP | 11123725 | * | 5/1999 |
| JP | 2009113244 | | 5/2009 |

OTHER PUBLICATIONS

French Search Report for FR application No. 1153682, dated Dec. 8, 2011, 4 pages.
Written Opinion for FR application No. FR1153682, date unknown, 6 pages (in French only).

* cited by examiner

Primary Examiner — Edmund Lee
(74) Attorney, Agent, or Firm — Reising Ethington P.C.

(57) ABSTRACT

A method and apparatus for molding a plastic element having a body with a surface from which at least one rib extends and an insert at least partially arranged against the surface and under the rib. The method carried out by the apparatus includes the steps of: (a) installing the insert against a wall of an injection cavity, the wall having at least one slit extending at least partially opposite at least one part of the insert, the slit being adapted to form the rib of the plastic element; and (b) injecting molding material into the injection cavity to create the body and the rib of the plastic element. A support element is positioned in the slit, against the insert, to support said insert during the injection.

9 Claims, 3 Drawing Sheets

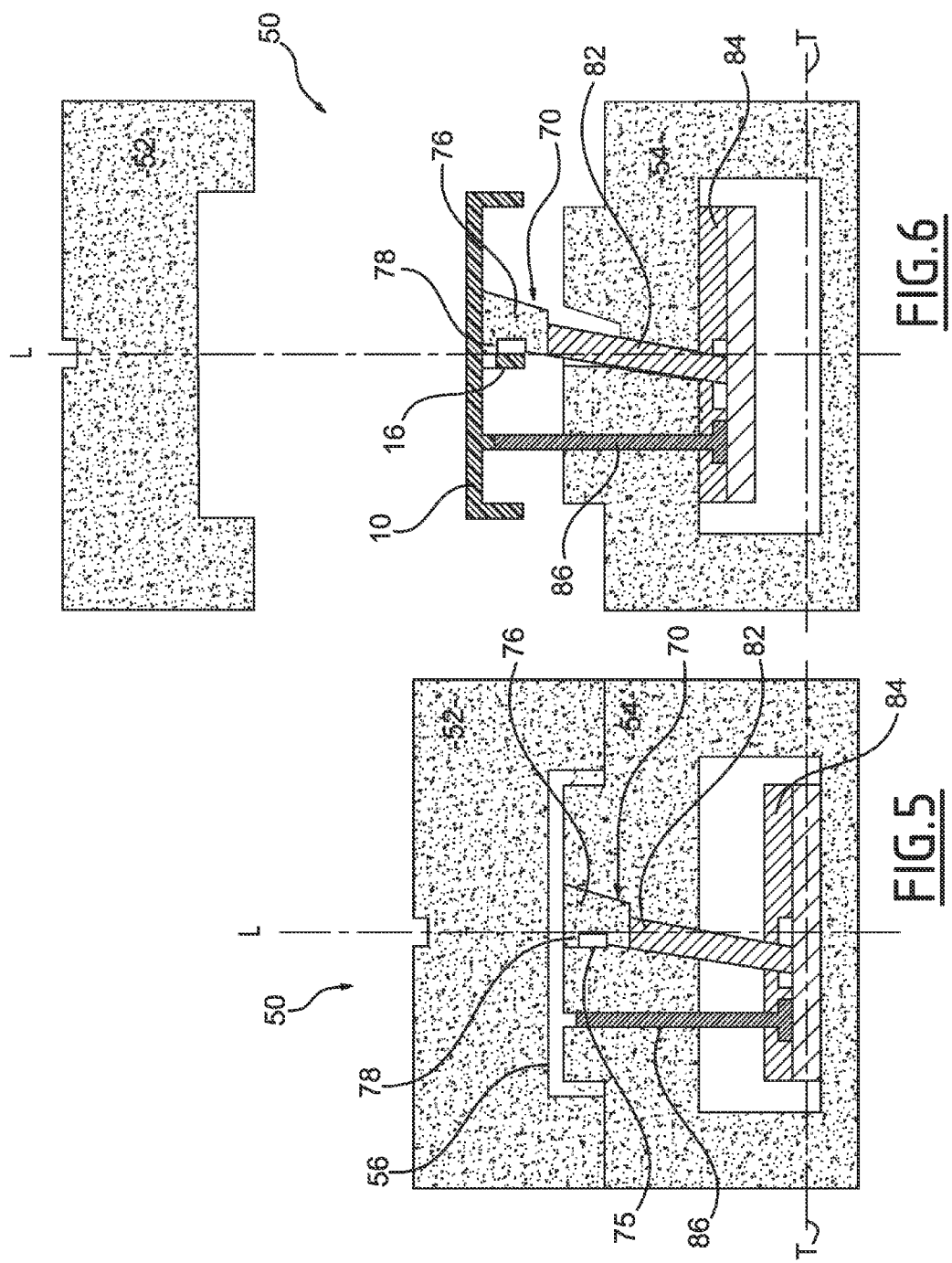

MOLDING A PLASTIC ELEMENT HAVING AN INSERT

TECHNICAL FIELD

The present invention relates to a method for insert molding of a plastic element.

BACKGROUND OF THE INVENTION

Molded plastic elements such as are used in motor vehicles are sometimes made with a body having a surface from which at least one rib extends, and an insert at least partially arranged against said surface and under said rib. These plastic elements may be made by installing the insert against a wall of an injection cavity, the wall comprising at least one slit extending at least partially opposite at least one part of the insert, the slit being adapted to form the rib of the plastic element, and then injecting molding material into the injection cavity to create the body and the rib of the plastic element.

Such a plastic element is typically intended to form a tactile surface, for example, for a motor vehicle central console, the or each rib being intended to stiffen the plastic element.

However, the known plastic elements are not fully satisfactory. In fact, it often happens that the insert is damaged during the molding process and that, once integrated into the plastic element, it cannot perform its function correctly.

SUMMARY OF THE INVENTION

One aim of the invention is therefore to propose a method and apparatus for molding the plastic element that is adapted not to damage the insert.

To that end, the invention in some embodiments relates to a molding method of the aforementioned type, in which a support element is positioned in the slit, against the insert, to support said insert during the injection.

According to preferred embodiments of the invention, the molding method comprises one or more of the following features, considered alone or according to all technically possible combinations:

the insert comprises an electric component;
the insert comprises at least one film;
the wall against which the insert is installed defines a surface for receiving the insert, and the support element defines a support surface of the insert which, when the support element is positioned in the slit, extends substantially in the extension of the receiving surface;
the support element is configured to form a window between the rib and the body, at the insert;
the injection cavity is delimited by two mold parts that can move relative to one another in a longitudinal stripping direction of the plastic element, and the support element can be maneuvered via an arm adapted to slide inside one of these two mold parts in a sliding direction that is tilted relative to the longitudinal direction.

The invention also relates to a plastic element comprising a body and at least one rib extending over one surface of the body, an insert extending along said surface of the body, overlapping on the rib, characterized in that the rib and the body together delimit a window, the insert extending through said window.

According to preferred embodiments of the invention, the plastic element comprises one or more of the following features, considered alone or according to all technically possible combinations:

the insert comprises an electric component;
the insert comprises at least one film.

The invention also relates to a motor vehicle comprising a plastic element as defined above.

BRIEF DESCRIPTION OF THE DRAWINGS

Other features and advantages of the invention will appear upon reading the following description, provided solely as an example and done in reference to the appended drawings, in which:

FIG. 5 is a cross-sectional view of a molding device of the plastic element, in a first configuration, and FIG. 6 is a view similar to FIG. 5, the molding device being in a second configuration.

DETAILED DESCRIPTION OF THE ILLUSTRATED EMBODIMENTS

Hereafter, the orientation terms "high," "low," "bottom," "top," "lower," "upper" are to be understood in a direction going from the hidden surface of the plastic element to its visible surface.

Figure 1:
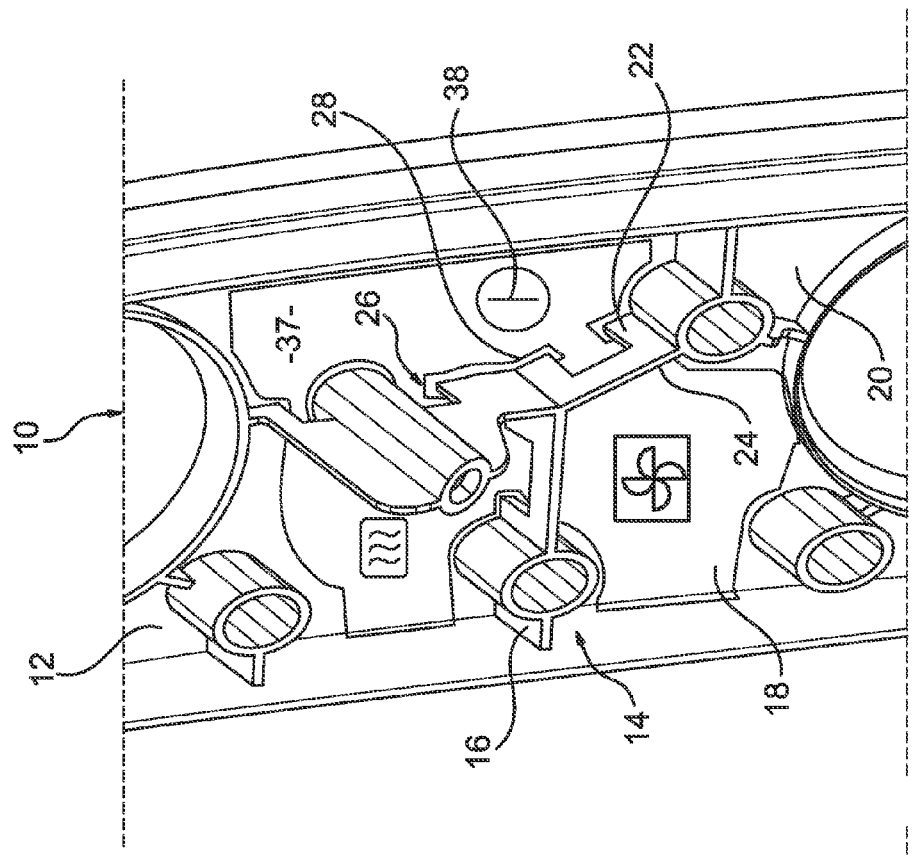
FIG. 1 is a partial perspective bottom view of a plastic element according to the invention.

As shown in FIG. 1, the plastic element 10 according to the invention comprises a body 12, a network 14 of reinforcing ribs 16, to stiffen the plastic element 10, and an insert 18, positioned between the body 12 and the ribs 16.

The body 12 defines a visible upper surface (not shown) of the plastic element 10. It is made from a plastic material and is preferably transparent or translucent.

The ribs 16 extend along a lower surface 20 of the body 12, opposite the upper surface. They protrude downward from the lower surface 20. The ribs 16 intersect so as to form the network 14. Each rib 16 is substantially straight and comprises two opposite large surfaces 22, 24.

Ribs 16 delimit, with the body 12, windows 26 positioned between the ribs 16 and the body 12. Each window 26 extends through a rib 16 and emerges in the two large surfaces 22, 24 of the rib 16.

The insert 18 extends along the lower surface 20 of the body 12, overlapping on the ribs 16. It is positioned above the ribs 16, between each rib 16 and the body 12.

The insert 18 extends overlapping on each rib 16 opposite a window 26. In other words, it extends through each window 26.

The insert 18 also comprises cutouts 28 for the passage of the ribs 16, so that each rib 16 extends from the body 12 through a cutout 28.

Figure 3:
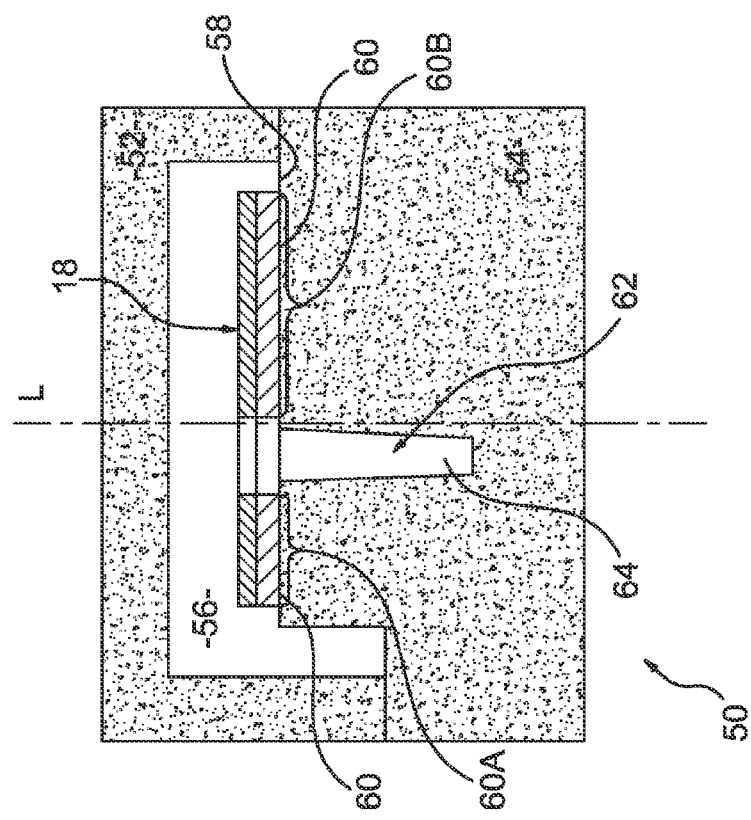
FIG. 3 is a cross-sectional view, along a plane marked III-III in FIG. 1, of the plastic element, during molding thereof.

The insert 18 comprises at least one electric component. In the illustrated example, it thus comprises conducting tracks 30, typically made from copper or with a base of conductive ink, to conduct electrical current. It also comprises a film 32 housing the conductive tracks 30. As shown in FIG. 3, the film 32 is a bi-layer film, the conductive tracks 30 being positioned between the two layers 34, 36 of the film 32. Preferably, the film 32 is translucent or transparent, to allow backlighting of the touch zones.

Figure 2:
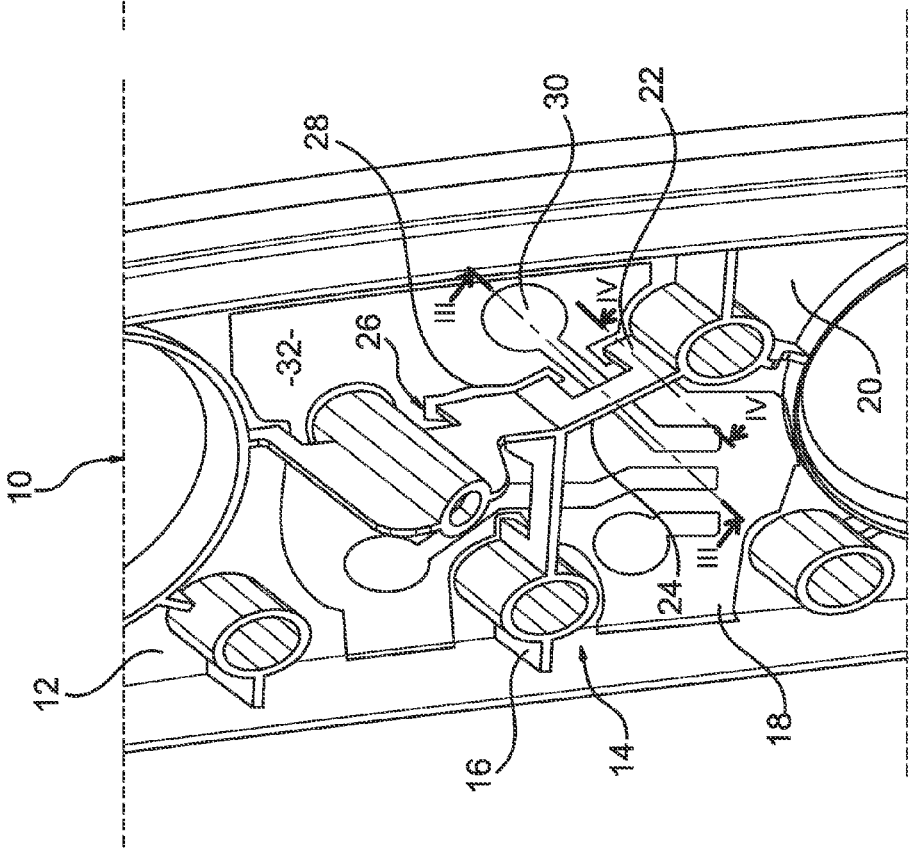
FIG. 2 is a view similar to FIG. 1 of a plastic element according to one alternative of the invention.

As visible in FIG. 2, alternatively, the film 32 does not contain a conductive track. It comprises a single layer 37 bearing icons 38 etched or printed on the layer 37. Typically, the icons 38 are made from translucent or transparent zones of the layer 37, the rest of the layer 37 being opaque, so as to allow the display of icons 38 on the visible outer surface when the plastic element 10 is backlit.

It will be noted that it is possible to combine the embodiments of FIGS. 1 and 2 by forming an insert 18 having a bi-layer film and an electrical component positioned inside the bi-layer film, one of the layers of the film bearing at least one icon.

The plastic element 10 is obtained by molding. A device 50 for molding the plastic element 10 will now be described, in reference to FIGS. 3 to 6.

Figure 4:
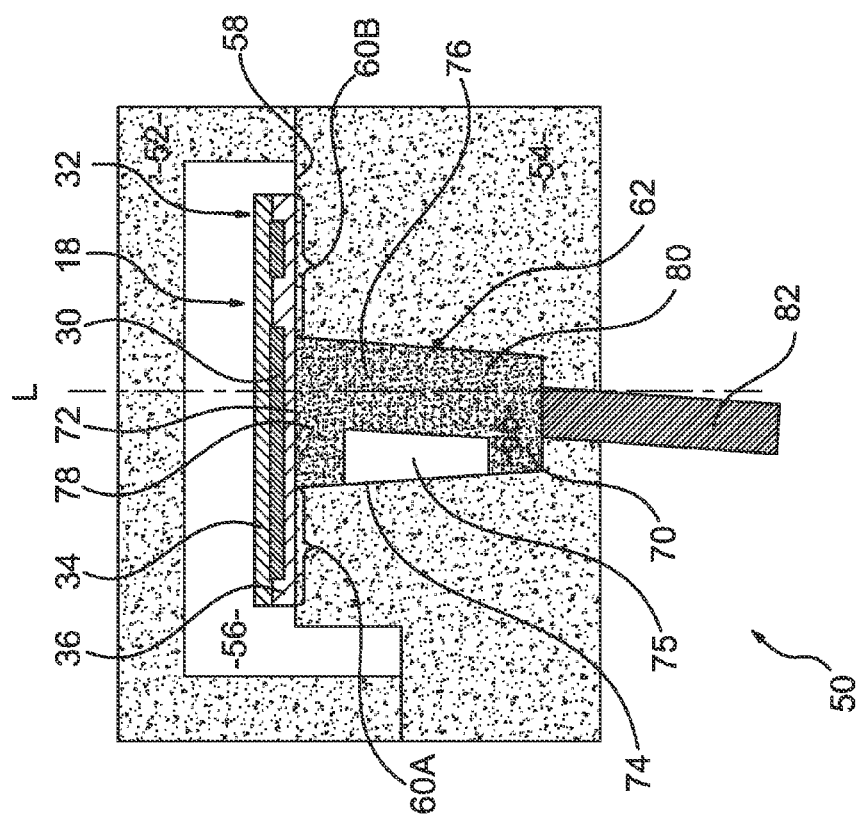
FIG. 4 is a cross-sectional view, along a plane marked IV-IV in FIG. 1, of the plastic element, during molding thereof.

As visible in FIG. 4, the molding device 50 comprises two mold parts 52, 54 that can move relative to one another in translation in a longitudinal direction L and intended to be pressed against one another to form an injection cavity 56 for the plastic element 10 between them.

A wall 58 of the cavity 56, that is part of the mold part 54, delimits a surface 60 for receiving the insert 18. This receiving surface 60 is not continuous. The wall 58 comprises slits 62 each extending between portions 60A, 60B of the receiving surface 60. Each slit 62 is adapted to form a rib 16.

Each slit 62 comprises narrow segments and at least one wide segment. FIG. 4 shows a narrow section 64 of a slit 62. FIG. 3 shows a wide segment 66 of that same slit 62.

As shown in FIG. 3, the wide segment 66 is adapted to receive a support element 70 of the insert 18 above the slit 62. The support element 70 is positioned below the insert 18, in the slit 62. It defines a support surface 72 of the insert 18 which, when the support element 70 is positioned in the slit 62, extends substantially in the extension of the receiving surface 60.

In particular, the support surface 72 is a solid and continuous surface, so as to avoid contact between the lower surface of the insert 18 and the injected plastic material.

The support element 70 defines, with a wall 74 of the slit 62, a passage 75 for the injection of plastic material. To that end, the support element 70 comprises a body 76 and an appendage 78 protruding relative to the body 76, the appendage 78 being positioned against the insert 18, between the insert 18 and an empty space of the wide segment 66 when the support element 70 is positioned in the slit 62, said empty space constituting the passage 75.

The passage 75 extends in the extension of the narrow segments 64 of the slit 62, so that the corresponding rib 16 is straight.

The body 76 is positioned in a portion 80 of the wide segment 66 in a recess relative to the narrow segments 64 of the slit 62.

The appendage 78 is intended to form the window 26 between the rib 16 and the body 12, at the insert 18.

As shown in FIGS. 5 and 6, the support element 70 is connected by an arm 82 to a platform 84, to maneuver the support element 70. The support element 70 is secured to the arm 82.

The arm 82 is substantially straight and extends partially through the mold part 54. It extends in a tilted direction relative to the longitudinal direction L and slides relative to the mold part 54 in said tilted direction. It is also slidingly mounted relative to the platform 84 in a transverse direction T substantially perpendicular to the longitudinal direction L and coplanar with the longitudinal direction L and with the sliding direction of the arm 82 relative to the mold part 54.

The transverse direction T is preferably substantially perpendicular relative to the extension direction of the slit 62.

The platform 84 is longitudinally mobile relative to the mold part 54. It is positioned opposite the injection cavity 56 relative to the mold part 54. It supports a foot 86 extending longitudinally and partially through the mold part 54, as far as the injection cavity 56 when the mold device 50 is in a mold configuration of the plastic mold part 10.

The foot 86 is adapted to slide relative to the mold part 54 in the longitudinal direction L, to eject the plastic element 10 at the end of molding.

A method for molding the mold part 10 will now be described, in light of FIGS. 5 and 6.

First, the molding device 50 is in a molding configuration, as shown in FIG. 5: the two mold parts 52, 54 are alongside one another, the platform 84 is spaced away from the mold part 54, and the support element 70 is positioned in the wide segment 66 of the slit 62. The insert 18 is installed in the injection cavity 56, against the receiving surface 60 of the wall 58 and against the support element 70. In particular, the insert 18 is installed so that its cutouts 28 are positioned at the narrow segments 64 of the slits 62.

Then, molding material, typically plastic, is injected into the cavity 56, to form the body 12 and the slits 16 of the plastic element 10. This material fills the cavity 56 and penetrates the slit 62, filling the narrow segments 64 of the slit 62, as well as the injection passage 75. Under the effect of the pressure of the molding material in the cavity 56, the insert 18 is pressed against the wall 58 and against the support element 70. The support element 70 thus provides support for the insert 18 above the slit 62 and prevents the latter from deforming under the effect of the pressure. Likewise, the support element 70 prevents injection material present in the slit 62 from exerting pressure on the lower surface of the insert 18, thereby causing a deformation of the insert 18 toward the inside of the injection cavity 56.

Once the molding material is solidified enough, the plastic element 10 is stripped. The molding device 50 then goes into a stripping configuration of the plastic element 10: the two mold parts 52, 54 are moved away from one another and the platform 84 is brought closer to the mold part 54. When brought closer to the platform 84, the arm 82 and the foot 86 move longitudinally relative to the second mold part 54. The foot 86 and the support element 70 then stress the plastic element longitudinally away from the mold part 54. At the same time, due to its incline relative to the longitudinal direction, the arm 82 slides transversely on the platform 84, causing the transverse movement of the support element 70. The appendage 78 is thus dislodged from the window 26, allowing stripping of the plastic element 10 outside the mold device 50.

Owing to the invention, it is possible to equip the plastic element with an insert extending between the ribs and the body of the plastic element. The plastic element thus keeps the advantage of stiffness imparted by the ribs, while being able to be equipped with relatively large inserts, easier to manipulate and ensuring, in the case of inserts comprising electric components, electrical continuity making it possible to make the outer surface of the plastic element touch-sensitive.

Furthermore, the insert is not deformed during the injection of molding material. The risks of damage of the insert are therefore reduced.

The invention claimed is:

1. A method for molding a plastic element, said method comprising the following steps:

providing a molding device, said molding device comprising two mold parts that can move relative to one another between an injection position, in which the two molds part are pressed against one another and define an injection cavity between them, and a stripping position, in which the two mold parts are away from one another, at least one of the mold parts having a wall defining a receiving surface, said wall comprising at least one slit extending between portions of the receiving surface;

positioning a support element in the slit, said support element defining a support surface which extends substantially in the extension of the receiving surface, and further defining, with a wall of the slit, a passage;

installing an insert in the injection cavity, against the receiving surface and the support surface;

injecting molding material into the injection cavity, the molding material filling the cavity and penetrating the slit and the passage, the insert being pressed against the receiving surface and against the support surface under the effect of the pressure of the molding material in the injection cavity; and solidifying the molding material, the molding material contained in the injection cavity forming a body of the plastic element and the molding material contained in the slit forming a rib of the plastic element, the body and the rib being formed together integrally as a single piece, the insert extending between the body and the rib.

2. The molding method according to claim 1, further comprising the following steps:

moving the two mold parts along a longitudinal direction from their injection position to their stripping position; and maneuvering the support element via an arm sliding inside one of said two mold parts in a sliding direction that is tilted relative to the longitudinal direction.

3. The molding method according to claim 1, wherein the insert comprises an upper surface oriented toward the injection cavity and a lower surface oriented toward the slit, and only the upper surface of the insert is in contact with the molding material during the injection step.

4. The molding method according to claim 1, wherein the slit comprises narrow segments and at least one wide segment in which the support element is positioned.

5. The molding method according to claim 4, wherein the passage extends in the extension of the narrow segments.

6. The molding method according to claim 4, wherein the support element comprises a body and an appendage protruding relative to the body, the appendage being positioned between the support surface and an empty space of the wide segment when the support element is positioned in the slit, said empty space constituting the passage.

7. The molding method according to claim 1, wherein the insert comprises an electric component.

8. The molding method according to claim 1, wherein the insert comprises at least one film.

9. The molding method according to claim 1, wherein the support element is configured to form a window between the rib and the body, with the insert extending through said window.

* * * * *